(12) United States Patent
Eichenlaub

(10) Patent No.: US 9,992,485 B2
(45) Date of Patent: Jun. 5, 2018

(54) BACKLIGHTING FOR HEAD TRACKING AND TIME MULTIPLEXED DISPLAYS

(71) Applicant: Dimension Technologies Inc., Rochester, NY (US)

(72) Inventor: Jesse B. Eichenlaub, Penfield, NY (US)

(73) Assignee: Dimension Technologies Inc., Rochester, NY (US)

( * ) Notice: Subject to any disclaimer, the term of this patent is extended or adjusted under 35 U.S.C. 154(b) by 149 days.

(21) Appl. No.: 15/200,954

(22) Filed: Jul. 1, 2016

(65) Prior Publication Data

US 2017/0006280 A1    Jan. 5, 2017

Related U.S. Application Data

(60) Provisional application No. 62/187,900, filed on Jul. 2, 2015.

(51) Int. Cl.
*H04N 13/00* (2018.01)
*H04N 13/04* (2006.01)
*G02B 27/22* (2018.01)
*F21V 8/00* (2006.01)
*G02F 1/1335* (2006.01)

(52) U.S. Cl.
CPC ........ *H04N 13/0418* (2013.01); *G02B 6/001* (2013.01); *G02B 6/0038* (2013.01); *G02B 6/0043* (2013.01); *G02B 6/0053* (2013.01); *G02B 6/0076* (2013.01); *G02B 27/2214* (2013.01); *G02F 1/133615* (2013.01); *H04N 13/0468* (2013.01); *H04N 13/0497* (2013.01); *G02F 1/133605* (2013.01); *H04N 13/0404* (2013.01); *H04N 2213/001* (2013.01)

(58) Field of Classification Search
CPC ...................................... H04N 13/00
USPC ...................................... 348/42–60
See application file for complete search history.

*Primary Examiner* — Andy Rao
(74) *Attorney, Agent, or Firm* — Brown and Michaels, PC

(57) ABSTRACT

A major component within a backlight device for liquid crystal displays (LCDs), in particular those backlights used in lighting and optical techniques to produce autostereoscopic 3D images and high resolution images.

20 Claims, 7 Drawing Sheets

BACKLIGHTING FOR HEAD TRACKING AND TIME MULTIPLEXED DISPLAYS

REFERENCE TO RELATED APPLICATIONS

This application claims one or more inventions which were disclosed in Provisional Application No. 62/187,900, filed Jul. 2, 2015, entitled "Backlighting for Head Tracking and Time Multiplexed Displays". The benefit under 35 USC § 119(e) of the United States provisional application is hereby claimed, and the aforementioned application is hereby incorporated herein by reference.

BACKGROUND OF THE INVENTION

Field of the Invention

The invention pertains to the field of backlighting for displays.

Description of Related Art

The lighting system within which the current invention is used has the general form, illustrated in FIG. 1, consisting of three major components:
1. A light line panel, usually rectangular in form, which emits light from a large number of bright, thin, parallel lines spaced across its surface. These lines are usually oriented vertically as seen by the observer, being parallel to the left and right sides of the display as seen by the observer, or in some configurations, tilted at a slight angle to those sides.
2. A lens array, usually in the form of a lenticular lens (a one dimensional array of parallel cylindrical lenses usually spaced across the surface of a glass or plastic substrate) but in some configurations a fly's eye lens array (a two dimensional array of square shaped lenses convex lenses usually spaced across a glass or plastic substrate).
3. A diffuser, which is often designed to diffuse light across a greater angle in one direction than others.
4. Electronic control means (not shown) which cause the light emitting lines and the panel to turn on and off individually or collectively in certain ways, with the turn on and turn off times usually being very rapid, and synchronized with the display of images on the LCD.

The LCD is placed in front of this assembly. In many designs the LCD must be placed at a precisely defined distance from the lens array and/or diffuser.

Detailed descriptions of this type of lighting system and its operation, variations, and use within displays employing DTI's technology are given in U.S. Pat. No. 4,717,949, U.S. Pat. No. 5,036,385, U.S. Pat. No. 5,349,379, U.S. Pat. No. 5,410,345, U.S. Pat. No. 5,428,366, U.S. Pat. No. 5,606,455, U.S. Pat. No. 8,189,129, and others. These patents are incorporated herein by reference.

The light line panel for this type of backlight possesses the following properties:
1. It must emit light from multiple, independently controlled vertically oriented or slanted light emitting lines like those described in the DTI patents listed above. There must be at least 2, and up to 16, independently controlled sets of thin light lines present.
2. Each set of lines must turn on and off rapidly, generally taking no more than 1 ms to turn on or off.
3. Each set of lines must be capable of lighting up in sections, proceeding from the top of the display to the bottom of the display in sequence, in order to follow the scan of the LCD and provide light behind each section of the LCD only after the pixels in that section have changed to produce a new image, as is explained in detail DTI U.S. Pat. No. 5,410,345.
4. The lines must be as small as possible, generally the smaller the better, no more than ~1 mm wide with a pitch of 1 mm or less.

SUMMARY OF THE INVENTION

The current invention relates to a major component within a backlight device for liquid crystal displays (LCDs), in particular those backlights used in conjunction with Dimension Technologies Inc. (DTI) lighting and optical techniques to produce autostereoscopic 3D images and high resolution images.

DETAILED DESCRIPTION OF THE INVENTION

LEDs on a PCB

Figure 1:
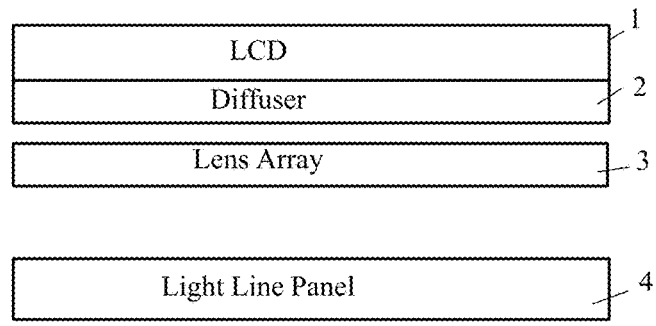
FIG. 1 shows a prior art LCD display.
Figure 2:
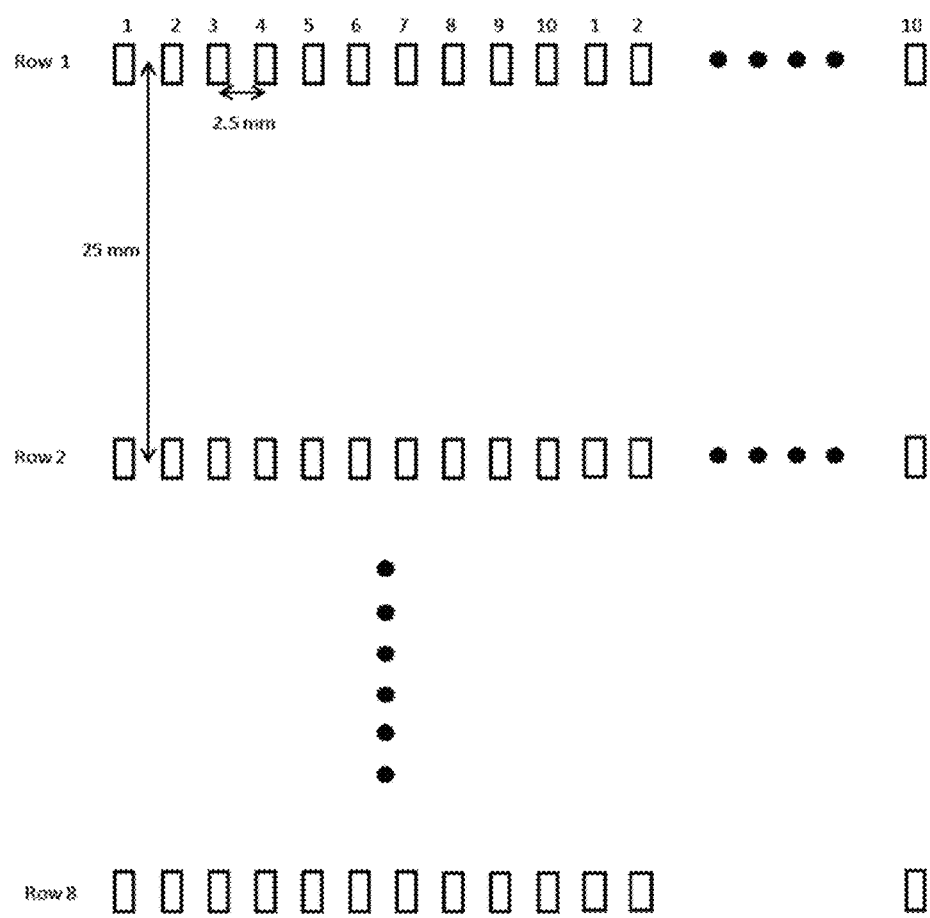
FIG. 2 shows an arrangement of LEDs in a display device.
Figure 11:
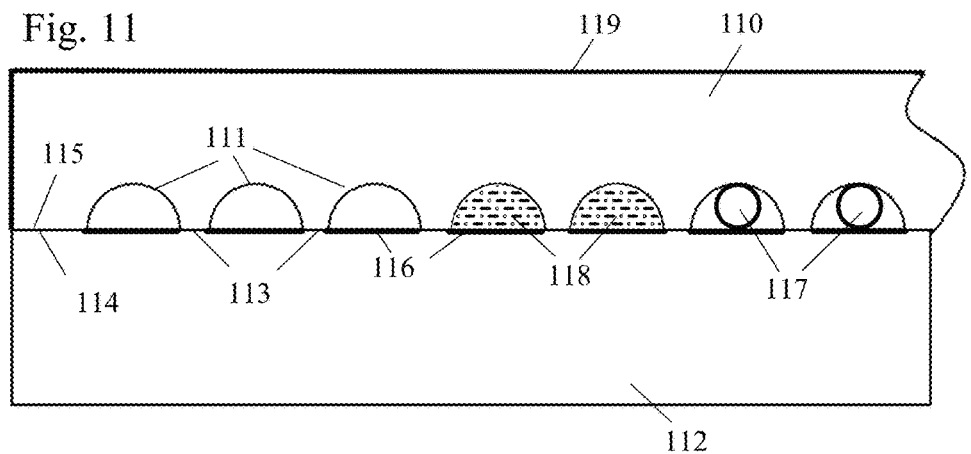
FIG. 11 shows a cut-through view of a fourth light guide concept.

As explained in DTI U.S. Pat. No. 8,189,129, in reference to FIGS. 1, 11, and 14 in that patent, LEDs mounted on a printed circuit board (PCB) assembly can be used as a light source. LEDs are an established technology that is steadily increasing in efficiency and decreasing in cost. One example of a possible LED arrangement is shown in FIG. 2, in this particular case designed for use with a head tracking display similar to that described in U.S. Pat. No. 5,311,220 and shown in FIG. 13 of this application.

Figure 13:
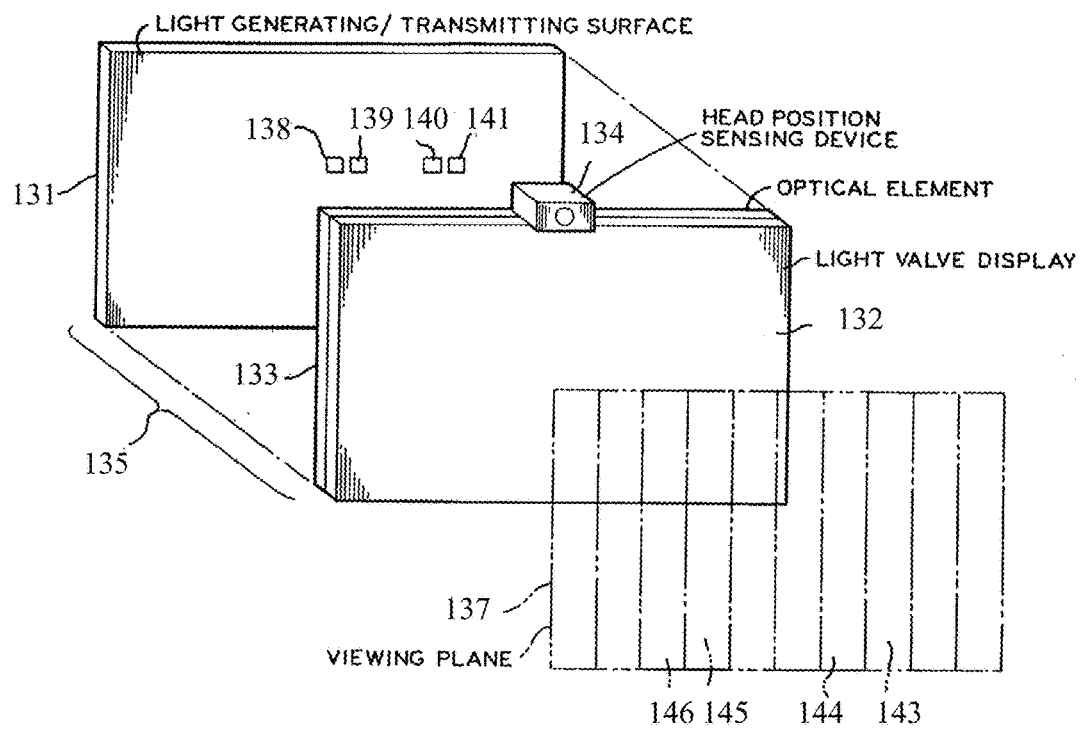
FIG. 13 shows an arrangement of a head tracking display of the prior art.

As can be seen in FIG. 13, the head tracking display from U.S. Pat. No. 5,311,220 comprises a surface 131 which can generate or transmit regions of emitted light, a transmissive display or reflective light valve display light valve 132 spaced apart from said surface, an optical element 133 located near said transmissive or reflective light valve display 132 and being generally of the same dimensions as said display, which focuses light from the light emitting regions on the first surface 131 onto a plane spaced apart from said display 132, means to cause the regions which emit light 131 to blink on, then off, one after the other, and to continuously repeat the process, means to cause the image on the transmissive display 132 to change rapidly so that a different image can be shown each time a different light emitting region 131 is turned on, a head position sensing device 134 located on the top portion display surface 132, and means to cause the light emitting regions on the first surface 131 to move in response to data on the observer's head position provided by the head tracker or head sensing device 134. This permits the autostereoscopic image to be transmitted only in the direction of the viewer of said image through the focusing action of the optical element.

A lens 133 is added at or near the display surface 132. The lens 133 serves to focus light from the surface of panel 131 onto viewing plane 137. The lens 133 need only act to focus light in the horizontal direction, but could also focus light in the vertical direction.

Panel 131 flashes light emitting locations 138-141 on, then off, one after another so that each location in turn is focused by lens 133 into regions 143-146 in plane 137. Location 138 would first flash on, and the light from it is focused toward region 143. Then location 138 would turn off and location 139 turn on and be focused into region 144. Next location 139 would turn off and location 140 would turn on and be focused towards region 145 and so on until region 141 flashes on, then off. After region 141 turns off the process is repeated starting with region 138.

When location 138 is on the display 132 would be displaying a scene with perspective appropriate to viewing from the position within region 143. When location 139 is on a perspective view appropriate to region 144 would be displayed, and so on, so that an observer's eye within any of the regions 143-146 near plane 137 would see a perspective view of some scene that is appropriate to its position. The transmissive display 132 would change images between the time one emitting region turns off and the next region turns on. Although four light emitting locations 138-141, providing light for four regions 143-146 are shown, a larger number of locations, one providing light for each of the regions shown in plane 137, could be used.

When in the above configuration a considerable amount of bandwidth and graphics operation time is wasted by providing perspective images to locations where no observer's eye is located. Typically, only one or two people will be viewing the display at any given time and their eyes will occupy at most four zones leaving the other zones wasted until the observer move their eyes into the other zones. This inefficiency can be overcome by the use of a head position sensing device known in the industry as a head tracker. The tracker operates in combination with the light emitting region generation surface 131 and the computer or other device which provides the images on the display 132.

A head tracking device, or head sensor, 134 is mounted on or near the display 132. The head tracker 134 determines the location of at least one viewer's head as the viewer sits in front of the device. Ideally, this head tracker 134 should be able to identify and track more than one observer's head.

The panel 131 sequentially flashes light emitting locations 138-141 on, then off, one after the other so that each in turn is focused by lens 133 toward the viewer's eyes located in or near plane 137. Location 138 would first flash on, and the light from it focused toward the first viewer's right eye. Then location 138 would turn off, and location 139 would turn on, and be focused on the viewer's left eye. Next, location 139 would turn off and location 140 would turn on and would be focused towards the second viewer's right eye, and then location 140 would turn off and location 141 would turn on to be focused toward the second viewer's left eye.

When location 138 is on, the light valve 132 would be displaying a scene with perspective appropriate to viewing from the position of the first viewer's left eye. When location 139 is on, a perspective view appropriate to the position of that viewer's right eye would be displayed, and so on, so that each observer would see a perspective view of some scene that is appropriate to his position. The transmissive display would change images between the time one emitting region turns off and the next one turns on. Furthermore, as the observer's head moved, the computer would move the locations of light emitting locations 138, 139 etc. so that they would remain focused on his or her eyes. In addition, the computer could change the perspective view on the light valve 132 so that as the observer's heads moved, they would see a changing perspective of the object, just as they would with a real object—they could move their heads and look around corners and so forth.

The number, and spacing, of the LEDs described here is representative of one particular display device; in practice a wide range of quantities and spacings could be used depending on the exact design of the display. The LEDs are arranged in straight rows and straight columns as shown in FIG. 2. In this case 150 LEDs are situated in each row and 8 are situated in each column. The spacing between the LEDs in each row is ~2.5 mm center to center horizontally, and the spacing between rows is 25 mm center to center. The LEDs in each row form 10 groups, with 15 columns in each group. Representative columns are numbered 1-10 in FIG. 2. The LEDs are the surface mounted type, rectangular in outline, and slightly over 3 mm×1 mm in dimension. The space between the LED should be flat black to minimize scattered light.

The electronics are designed so that it is possible to turn on the LEDs in the patterns and sequences described below.

Since this is a head tracking display as shown in FIG. 13, described above, a miniature video camera 130 will be mounted on the top of the display 132. This camera 132 obtains images at minimum every ⅓₀th second. The images from the camera are sent to a PC, where off the shelf software such as Open CV analyzes the images, identifies the positions of one or two people's eyes, and calculates the center position of their heads in the image. The head positions are translated into one of ten 4 digit binary codes between 0000 and 1001 every ⅓₀th second. For example, code 0000 might be returned when the person is situated directly in front of the display, with codes 0001, 0010, and so forth being returned as the person moves to the right, and codes 1001, 1000, etc. being returned as the person moves to the left. These 10 codes will indicate which of the 10 groups of LEDs flashes during the next LCD scan. The electronics board just has to be set up to cause the correct set of lights to flash when a given code is received.

For any given head position, two groups of LED columns flash on and off. In this example, one group consists of LEDs in four adjacent columns, for example, all columns 1-4. The other group will consist of LEDs in four adjacent columns between those, for example in all columns 6-9. These two groups are separated from one another by one non-operating (off) group (all the columns 5 in the example above.

The LCD scans itself every ¹⁄₁₂₀th second and displays a first image in field 1, a second image in field 2, etc. If the person is reported to be in the center position ("0000"), then the LEDs in the group consisting of columns 6-9 flashes on during even fields and the LEDs in the group consisting of columns 1-4 flashes on during odd fields. They continue doing so until the eye tracker reports a position change by sending a different binary code. As soon as the person is reported to have moved to the left by a certain distance, the binary code "0001" is sent and LEDs in columns 7-10 flash and then LEDs in columns 2-5 flash, and continue to do so until another binary code change occurs. If the person is reported to have moved to the right by a certain distance, the binary code 1001 is sent and LEDs in columns 5-8 and LEDs in columns 10-3 flash. In other words, the groups of columns that are flashing will march to the left or right in steps of one column as the person moves to the right or left.

Timing of LED Turn on Relative to the LCD Sync and Scan

The LEDs use the LED sync signal to time their turn on and turn off relative to the beginning of each LCD scan. The LEDS do not turn on immediately at the start of each LCD scan. Rather, they wait until the pixels in the area in front of each LED have changed to create their part of the next image. The LCD scan proceeds vertically from top to bottom, requiring almost $\frac{1}{120}$th second, about 8 ms to complete the scan. Therefore there will be a delay of 3 ms between the start of the scan and the turn on of the LEDs near the top of the display—approx. 1 ms for the scan to pass the area of the display in front of the first two rows of LEDs, and another 2 ms, for all the pixels in that section to complete their change to the next image. The LEDs in each subsequent group of two rows will be turned on sequentially from top to bottom so that each comes on only after the pixels in front of it have completed their change to the next image. LEDs in rows 1 and 2 in the flashing columns will be turned on 3 ms after the scan begins. LEDs in rows 3 and 4 will be turned on approximately 1 ms later, LEDs in rows 5 and 6 will be turned on approximately 1 ms after that, and so forth. The exact turn on times will be determined by exactly how long it takes the LCD to scan from the top to bottom. There is usually a delay before that start of the scan, and the scan plus delay adds up to 8.333 ms, so the scan time will be less than 8.333 ms.

The LEDs will likewise turn off in sequence from top to bottom. LEDs in rows 1 and 2 will turn off just as the next scan is starting at the top of the LCD, LEDs in rows 3 and 4 will turn off about 2 ms later, and so forth.

The above description is meant to be one example of an LED lighting design for use with the present invention. The arrangement of the LEDs is not limited to perfectly straight rows and columns, for example in one display that has been built, the LEDs in each row are staggered such that the even numbered LEDs (counting from the left) are shifted downward by one LED length, in order to avoid heat issues that would result from the LEDs being spaced too close together.

Furthermore the number of LEDs columns that are on at any given time are not limited to four, as in the example described above. The exact number of columns that turn on at any given time depend upon the exact design of the system, and could conceivably be anywhere from one to some very large number N. Furthermore, the description above describes an example where the two columns of LEDs that alternately flash on and off (1-4, 6-9, etc.) are always separated by one column which remains dark. In practice, it was determined that the best results are obtained when there are no dark columns separating the two groups of columns; for example, in the system described above, columns 1-5 etc. would alternately flash with columns 6-10 etc.).

As shown in the arrangement of FIG. 13, light from the LEDs on surface 131 passes through and a fly's eye lens 133 and is focused toward the observer's eyes. The LCD 132 is placed directly in front of the fly's eye lens 131, between the fly's eye lens 133 and the observer viewing plane 137.

Since the LEDs are spaced apart from each other in the vertical direction by a considerable distance, a diffuser is used to spread their light in the vertical direction so that each column appears as a continuous vertical line. A slight amount of diffusion is used in the horizontal direction so that the vertical lines of light are spread out slightly so that they appear to touch each other. The diffuser or diffusers used to accomplish this may be mounted between the fly's eye lens 133 and the LED panel 131, or in front of the fly's eye lenses 133, or in both places, for example with the diffuser responsible for spreading light in the horizontal direction being placed between the fly's eye lens and the LEDs, and the diffuser responsible for spreading light in the vertical direction being placed between the fly's eye lens and the LCD.

Backlight systems sometimes consist of banks of up to thousands of LEDs, depending on the size of the display, arranged in independently controlled columns, each of which possesses several independently controlled segments to allow illumination to follow the scan of the LCD from the top to the bottom of the display. Each of the light lines may consist of a column of up to several dozen off-the-shelf surface mount LEDs spaced evenly along the row. The single most expensive component in the entire system is usually the LEDs.

In general, the cost of a system employing a small number of bright LEDs is much cheaper than a system employing a large number of dimmer LEDs. A typical LED backlight for an LCD panel employs a few hundred LEDs mounted along the edges of a rectangular light guide. Unfortunately, the simple solution of employing fewer brighter LEDs spaced evenly across a PCB behind the LCD will not work, because the gaps between the LEDs become so great that, for geometrical reasons having to do with the relative spacing of the LEDs, the lens array, plus the diffuser, the thickness of the backlight is forced to increase considerably to many inches.

An alternative lighting panel design is needed, which allows the use of a limited number of LEDs within a tight space and has all of the properties listed above plus the following additional property:

5. Each line being on the order of 0.5 mm in width, with the goal being less than 0.25 mm in width.

It is not practical to use a second LCD panel in front of a bright conventional backlight to create the lines, because of the great light loss that would result from such a configuration.

Several alternative designs for light guides are possible that would direct light from a limited number of LEDs along channel shaped linear structures on or within a planar substrate with features than can reflect the light out of the channels and toward the lenticular lens and LCD. Regardless of design, the backlight in its entirety is envisioned as being made up of several smaller plate sections tiled together on a substrate. The light sources (likely to be LEDs in most cases) illuminating each set of channels in each plate could be turned on and off independently to allow the illuminated area to follow the scan of the LCD.

First Channel Light Guide Concept

Figure 3:
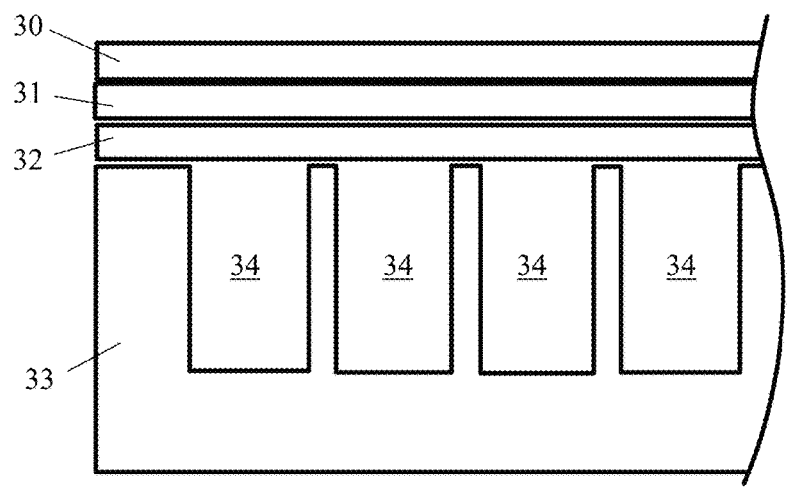
FIG. 3 shows a side cut-through view of the first channel light guide concept.
Figure 4:
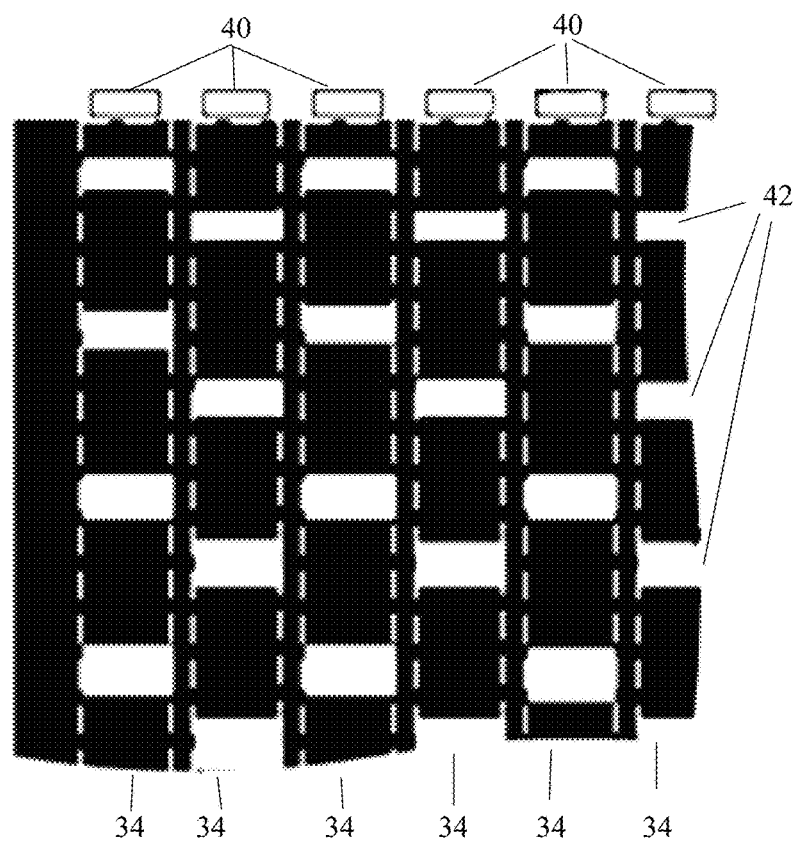
FIG. 4 shows a front view of the first channel light guide concept.

The first light guide concept is illustrated in FIGS. 3 and 4.

The basis of the backlight system is a flat plastic plate 33 containing many dozens of small (typically on the order of 1-2 mm wide) rectangular or elliptical parallel grooves or channels 34. These and other features are shown as a magnified cross section in FIG. 3 and as a magnified front view in FIG. 4.

One or more independently controlled light sources, such as LEDs 40, will be positioned at one end of each channel 34, with a highly reflective surface such as a first surface mirror positioned at the other end of the channels. Ideally, however, light sources will be positioned at both ends of each channel. It should be noted that in this and subsequent descriptions in this application, the LEDs described therein could be replaced by other bright light sources, such laser diodes or OLED sources, depending the application and its requirements. LEDs are the preferred light source at this time and in most circumstances, but the term "LED" is not meant to limit the invention to the use of that particular light source.

The channels 34 will be made highly reflective with an enhanced aluminum or other highly reflective coating. On top of the channels will be placed a thin (on the order of 0.125-0.25 mm), flat black plastic sheet 32 with holes 42 cut in it as shown in FIG. 4. The sheet 32 will be mounted directly on top of the channel plate 33. The side of sheet 32 facing the channel plate 33 will be aluminized with an enhanced aluminum or other highly reflective coating; the other side will be flat black. A sheet of light directing film 31, such as 3M's "brightness enhancing film" will be placed on top of the opaque sheet 32, and a second opaque sheet 30 with holes 42 coincident with those of the first sheet 32 will be placed over it. The light directing film 31 consists of a thin sheet of plastic with microscopic parallel prism shaped ridges molded into the side facing the channel plate 33.

It is theoretically possible to refract light evenly from the channels without the opaque sheets 30 and 32, using light directing film with prisms of varying sizes or angles from the ends to the centers of the channels, but such a configuration exposes the entire highly reflective surface of the channel plate, allowing it to reflect stray light reflected or scattered backwards from the lenticular lens, diffuser, and LCD. This stray light, reflected back from channels which should be dark at any given time, will cause ghosting (the visibility of a faint version of one perspective view to eyes in locations where they should only see one of the other perspective views).

The hole 42 structure, on the other hand, allows as much of the surface area as possible at the front of the channel plate to be flat black, at a small sacrifice in efficiency of the lighting system due to absorption by the rear aluminized surface of the opaque sheet. The varying width of the holes 42 causes the amount of light exiting from each to be equalized. Preliminary ray trace analysis indicate that it is fairly easy to equalize light output in this way—and also that despite the fact that the emitting areas are smaller than the opaque areas, an efficiency of 50% or more might be achieved.

Second Channel Light Guide Concept

Figure 5:
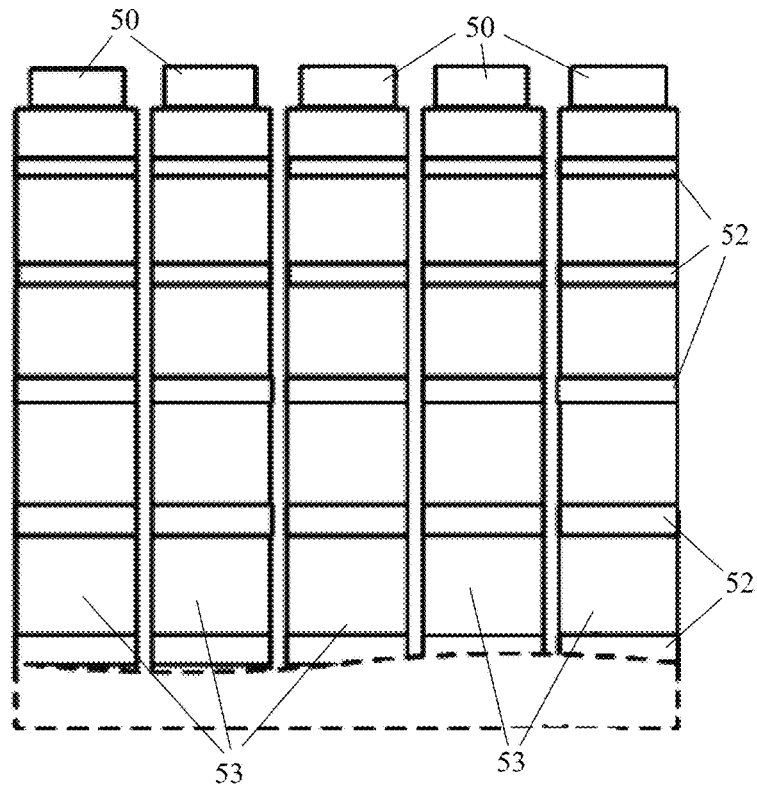
FIG. 5 shows a front view of a second light guide concept.

The second light guide concept is illustrated in FIG. 5. Here the channels 53 are made of solid plastic instead of hollow aluminized voids, and light from LEDs 50 is reflected through the channels 53 by total internal reflection. This design represents more of a manufacturing challenge due to the small size and length of the solid structures used as channels—essentially 1 or 2 mm wide by 100 mm or more long individual lengths of plastic, glass, or other high index transparent material. However, the efficiency of this configuration should be greater due to less absorption during total internal reflection. After examining the use of fiber optics and trying to find some way to injection mold or extrude rectangular plastic bars of these dimensions it was decided that the solid channels might be easily manufacturable by stacking a large number of smooth plastic sheets of thickness equal to the channel width in a jig and collectively cut to the length and depth required, then flame polished on the cut sides.

The base of the resulting plastic channels can then be imprinted with areas of reflecting paint 52 of varying width, or scattering areas of varying width, with the areas becoming wider near the center of each channel than at the edges, causing an equal amount of light to be reflected from each area. A flat black opaque sheet can be mounted to the rear of the channels. Ideally this opaque sheet would have reflective areas, ideally areas of deposited aluminum, on its surface coincident with the positions of the reflective or scattering areas. Here, too, a circularly polarizing sheet on the front side of the channels would reduce reflections.

The ultimate version of each of these configurations would possess channels of no more than about 0.5 mm width, ideally down to 0.25 mm width. The former size could potentially allow the lenticular lens to be eliminated in very large (66") HD TVs and monitors; the latter size could potentially allow the elimination of the lenticular lens in the popular 46" TV sizes; the light emitting channels would be so small that there would be no reason to re-image them to create lines of the correct width and spacing. Light channels of this size range can apparently be fabricated, but unfortunately off-the-shelf LEDs or of the required brightness don't come in sizes small enough to fit in the ends of the channels. In addition, the use of such small channels would increase the number of LEDs required to several thousand, which would defeat one of the purposes of using the channels. A better solution is to introduce light into the ends of the channels via fiber optic strands. These fiber optic strands would be designed to bring in light from a smaller number of independently controlled LEDs or laser diodes at the edges of the backlight into the multiple sets of channels. Each set of fibers going to sets of lines that could be turned on and off at the same time would be collected and coupled to one LED or laser diode.

Third Light Guide Concept

The third light guide concept entails the use of channels in one surface of a planar substrate to hold fiber optic strands within the channels themselves. The fiber optic strands are illuminated from either end and possess internal structures or surface features that cause them to scatter light their sides evenly along their lengths. One example of such fibers are made by Corning under the Firbrance brand name.

The fabricated channel assemblies that hold the fiber optics which create the lines of light behind the LCD will consist of two plastic plate assemblies. Each plate assembly will consist of a sandwich of two plates, one containing channels to hold fiber optic strands, and the other attached to it to hold the fiber optic strands in place. The fiber optics in question must be abraded or otherwise treated to cause light to scatter out of the sides of the fibers evenly along the lengths that are held within the channels. Means to cause light to exit evenly out the sides of fiber optic strands are well known to the art of optical fiber manufacture.

Figure 6:
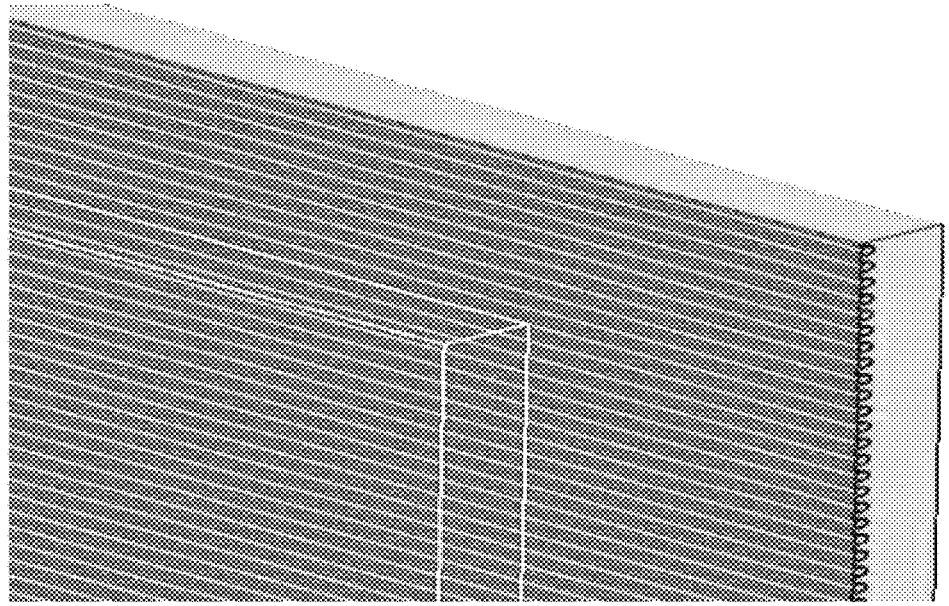
FIG. 6 shows a perspective view of a third light guide concept.
Figure 7:
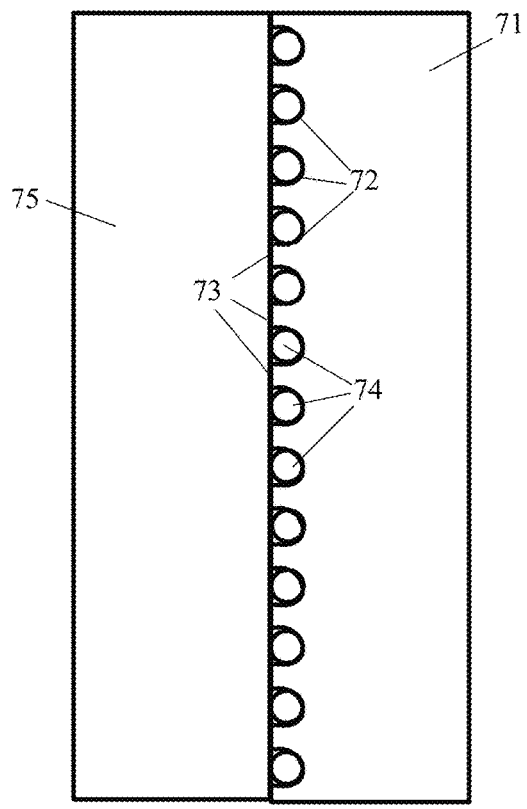
FIG. 7 shows a cross-sectional view of the third light guide concept.

FIG. 6 shows the fiber optic channel light guide concept as an oblique exploded view, and FIG. 7 is a cross sectional view (note that in reference to FIG. 6, the channels will be oriented vertically, not horizontally as shown).

FIG. 7 shows a plate 71 with the channels 72 formed in it. It could be made of aluminum or plastic. The channels 72 will be U shaped in cross section and ideally slightly over 0.25 mm wide and slightly over 0.25 mm deep—just large enough to hold individual 0.25 mm diameter fibers. The channels can be placed 0.5 mm+/−0.025 mm apart. The plates could be made of plastic or aluminum or other material, and must be aluminized to make the channels highly reflective. The flat areas 73 between the channels 72 must be flat black; this could be accomplished through pad printing after the entire surface of the plate is aluminized. The fibers 74 would be laid in the channels 72 and a clear plastic cover 75 would be placed on the channel plate 71 and attached by any one of a number of methods.

The purpose of the channels is to hold the fiber optics 74 in place along straight lines. Fiber optics 74 are designed to accept light from their ends and scatter light evenly out their sides, thus creating lighted lines running the length of each channel. 0.25 mm diameter fibers are preferred, but smaller fibers could be utilized if such are available.

Some experiments with test assemblies indicate that it may be practical to keep fibers sufficiently parallel without channels, instead holding the fibers parallel during assembly and epoxying them to a flat plate.

A clear plastic plate 75 is attached to the surface of plate 71 after the fiber optics 74 are in place. Each fiber 74 will be either coupled to an ordinary non scattering relay fiber near the edge of the plastic plate assembly, or else a single, continuous fiber would be used which is only modified to emit light out its sides along the length that sits within the channels 72.

Figure 8:
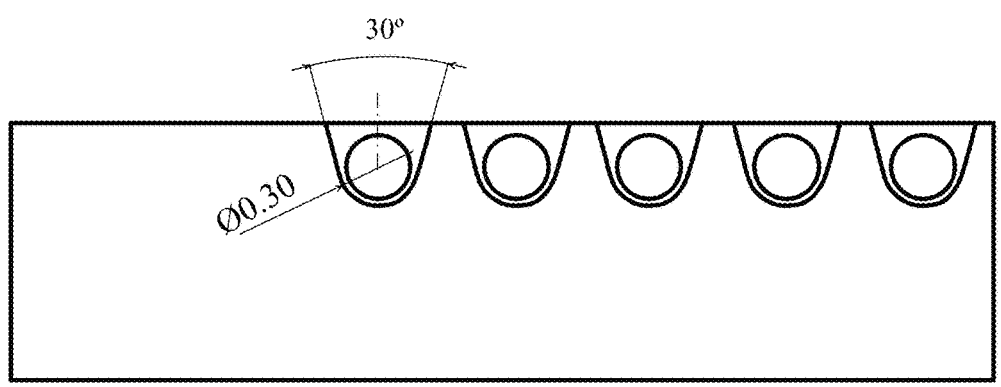
FIG. 8 shows part of a CAD drawing used to fabricate a test part of the third light guide concept.

FIG. 8 shows part of a CAD drawing that was made to fabricate a test part successfully using a high resolution 3D printing machine.

Figures 9, 10:
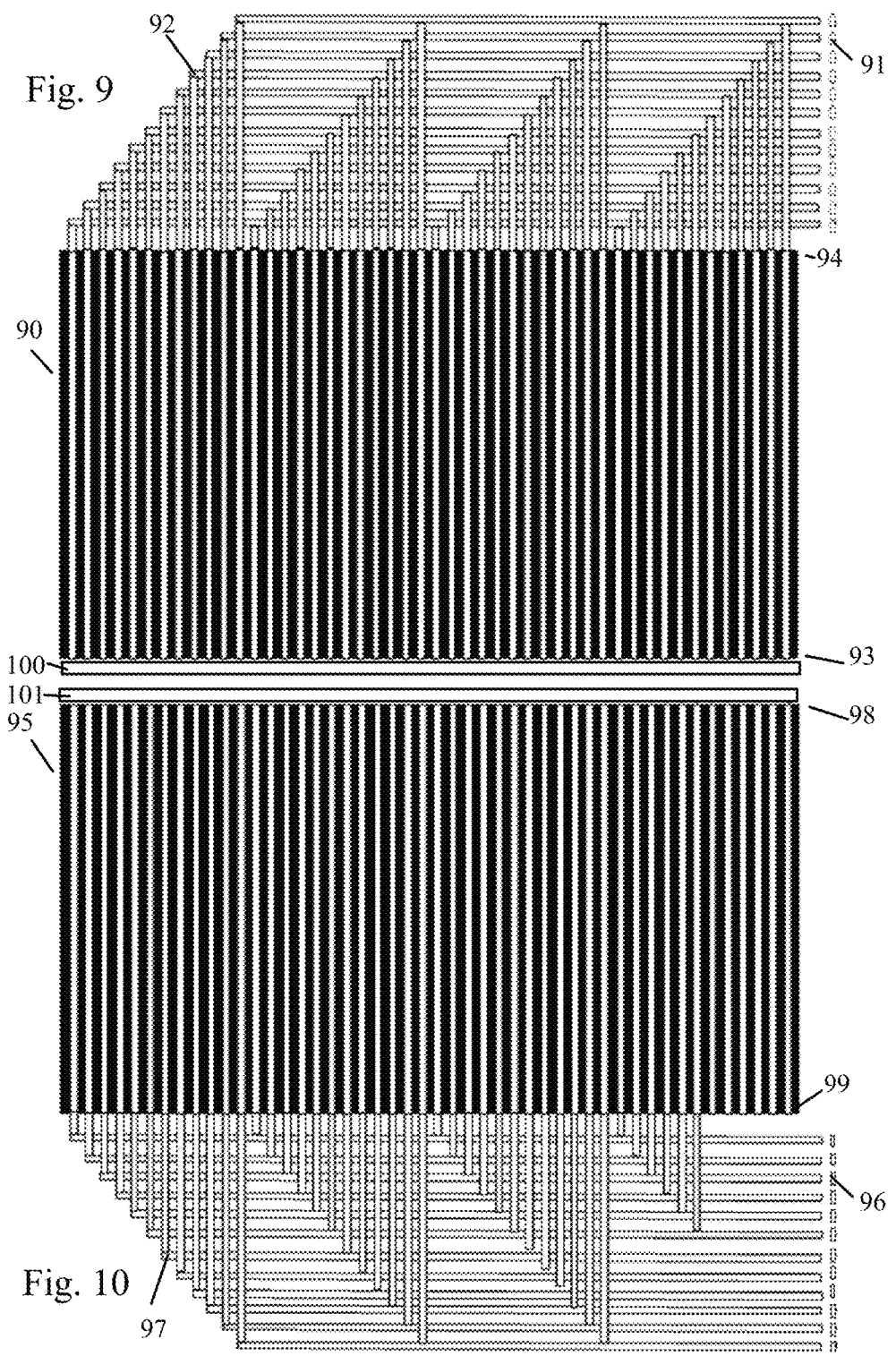
FIG. 9 is a front view of the top half of an assembly that would fit behind the top half of an LCD.
FIG. 10 is a front view of the bottom half that would fit behind the bottom half of the LCD.

FIG. 9 is a front view of the top half of an assembly 90 that would fit behind the top half of an LCD. FIG. 10 is a front view of the bottom half 95 that would fit behind the bottom half of the LCD.

As shown in FIGS. 9 and 10, groups of these fibers 92 and 97 will be collected and the resulting bundles coupled to bright LEDs 91 and 96. In this particular example, there are twelve independently controlled sets of light lines, so each bundle will collect fibers from every twelfth channel, so there will be twelve bundles of fibers 92 and 97 each coupled to twelve independently controlled flashing LEDs 91 and 96 used to illuminate each plate 90 and 95. In practice, there could be any number of sets of light lines from two up to several dozen.

The edge 93 and 98 of the plate 90 and 95 opposite the edge 94 and 99 where the bundles exit can be covered by a first surface mirror 100 and 101 to reflect light back into the fiber optic strands 92 and 97. An alternative is to collect the fibers into bundles at both ends—either into the same set of bundles or into a separate set coupled to a second set of LEDs—in order to send light into both ends. Emission of light along the length of the fiber is generally more even if the fiber is illuminated from both ends.

Two plate assemblies 90 and 95 will be butted against each other along the long edges 93 and 98 on which the mirrors 100 and 101 are mounted. Thus the plate assembly 90 in FIG. 9 will sit behind the top half of the LCD and the plate assembly 95 in FIG. 10 will sit behind the bottom half of the LCD.

The fibers will be arranged in multiple sets of channels: For example, the specification that FIGS. 9 and 10 were taken from called for fifty-two groups of twelve channels which repeat across the entire backlight assembly. The fifty-two groups of fibers in the first group of channels, counting from the left side, are in one group, the fifty-two groups of fibers in the second group of channels are in the second group, the fifty-two groups of fibers in in the third group of channels are in the third group and so forth.

The fibers 92 and 97 in each group are bent and collected into a bundle of fifty-two fibers, and each bundle will is optically coupled to one independently controlled LED 91 and 96. Thus twenty-four bundles of fibers 92 and 97 are present, coupled to twenty-four LEDs 91 and 96. For different designs, different number of lines, groups of lines, and bundles can be used.

Fourth Light Guide Concept

The fourth light guide concept is an alternative to the fiber optic design. This embodiment, shown in FIG. 11, consists of two flat low index plastic panels 110 and 112 mounted face to face. A series of parallel concave grooves or channels 111 with thin flat areas 113 between them is molded or cut into one of the panels 110.

The surface of the flat plastic panel 112 possess patterns 116 of scattering structures or of white ink or paint which cause light striking the structures or ink to be scattered out of the channel 111. The surfaces of the grooves 111 on the other panel are smooth and transparent.

The two panels are bonded together groove face 115 to flat face 114 so that the grooves 111 line up with the scattering structures 116 or ink on the flat face 114 of the other plastic panel 112.

Optionally, a high index liquid material 118, such as epoxy or high index immersion liquid, can be drawn into the grooves 111 with a vacuum applied to the opposite ends. In the case of epoxy, the epoxy is cured to solid form with UV light; in the case of high index liquid, the liquid is sealed in the grooves 111 via end caps in the panels.

Rows of LED lights, one on one end or both ends of each channel 111, can be used to direct light into each channel 111. Alternatively, fiber optic strands 117 can be inserted into one or both ends of each channel 111 and collected into multiple bundles and coupled to LED or laser diode light sources as described above for other embodiments.

Light hitting the scattering structures 116 or reflective ink or paint is scattered out of the groove 111 and out of the panel structure. Each groove 111 is thus seen as a bright line of light when observed from the side 119 opposite the scattering structures 116 whenever the LEDs on either end are on.

All of the channel plate and fiber optic plate concepts and fiber optic designs described above can benefit from a diffuser, similar to that described in reference to FIG. 2, placed in front of the plate and designed to diffuse light more in the vertical direction than the horizontal direction, in order to eliminate visibility of the gaps between the holes 42, painted areas 52, 116, or fiber plates 90 and 95, as well as the horizontal gaps between the channels or fibers.

OLED Light Line Plate

OLED technology can potentially be used as a light source as alternative to the LED arrangements and channels described above. Although the embodiments of OLED technology commonly used in TVs and smartphones is not bright enough for use in this LCD lighting application, there is another branch of OLED technology that is—namely OLED lighting technology which is currently being developed for use in overhead lighting and novelty lighting fixtures as a potential replacement for CCFL and LED technology.

Figure 12:
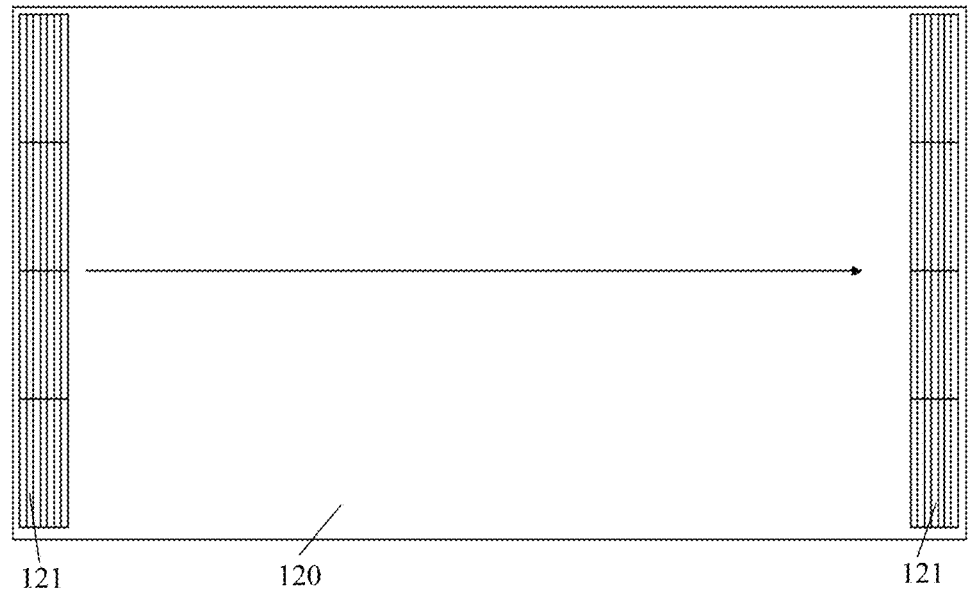
FIG. 12 shows a top view of an OLED panel which can be used as a backlight for an autostereoscopic display.

The most likely configuration for an OLED panel 120 used as a backlight for an autostereoscopic display is shown in FIG. 12. The easiest configuration to fabricate would use monochrome pixels where each line 121 is made up of several individual pixels. The OLED pixels would be arranged in a raster pattern with straight rows and columns (in some configurations slanted slightly in one direction, in some configurations to form lines like those described in U.S. Pat. No. 8,189,129 mentioned above.

In FIG. 12 a large number of columns of pixels 121 are shown, with a large number of pixels placed next to each other in the horizontal direction to form rows. In this case, four rows of pixels are shown, with each pixel being much taller than it is wide in the particular design shown, but other numbers of rows and could be used. The electrical traces of the OLED panel would be designed in such a way that individual groups of pixels in each row could be turned on and off independently in a manner either similar to the sequences described in relation to the fiber optic strands in channels described above, or similar to the lines and light sources described in U.S. Pat. No. 5,349,379, U.S. Pat. No. 5,410,345 or U.S. Pat. No. 8,189,129. Illumination for 2D images would be obtained simply by turning all the lines on at lower power. A weak holographic diffuser or equivalent diffuser could be used directly on the front of the panel, ideally laminated to it, to spread the light just enough to bleed into the gaps between the pixels. Having a line width to exactly equal the line pitch, so that adjacent lines just touch each other, is highly desirable in some 3D displays, as explained in U.S. Pat. No. 8,189,129.

The type of OLED panel technology that is contemplated for this application has a highly reflective mirror-like front surface. It is possible almost totally eliminate reflections from this surface of the OLED panel by use of circular polarizers placed in front of the OLED panel. In some display configurations, it would be beneficial to add a second linear polarizer in front of the ¼ wave retarding sheet, with its polarization direction orthogonal to that of the polarizer on the side facing the OLED panel. The circular polarizer would consist of a linear polarizer on the side facing the OLED panel, and a ¼ wave retarding sheet placed in front of linear polarizer, on the side facing away from the OLED panel. This is a standard method of reducing such reflections from smooth surfaces. This would be combined with anti-reflective coatings on the protective glass surface at the front of the panel and on other exposed surfaces such as any diffusers used and on the rear polarizer surface of the LCD In most cases, the OLED panel 120 described above, like the channel plates and LED arrays described in previous sections, will be used behind a lenticular or fly's eye lens within an arrangement similar to that of FIG. 1. However, given the small size that is theoretically possible with OLED panels, it is possible that with some LCDs it will be possible to use OLED pixels that closely match the width and pitch of the individual pixel elements (RGB) of the LCD itself, the only difference being a slightly larger pitch for the OLED pixels in the horizontal dimension, calculated according to well-known formulas for the spacing of light lines behind pixels in an autostereoscopic LCD based display, such as is explained in U.S. Pat. No. 4,717,949. This would allow one to dispense with the lenticular or fly's eye lens array, and simple mount the OLED panel and its polarizers and diffusers behind the LCD, creating a very thin display.

The light emitting pixels of the OLED panel would ideally be individually addressable, allowing any combination to be turned on or off at any time. This would allow the use of different combinations of and lighting sequences of light lines to allow the illumination to follow different numbers of users' heads in a head tracked display such as the one described in U.S. Pat. No. 5,311,220, or to change the number of viewing zones being displayed in a multiview display of the type described in U.S. Pat. No. 8,189,129.

The panel with individually addressable pixels would be designed for operation in the manner typical of a normal display device: It would be scanned from top to bottom at the same rate as the LCD, which would typically be a rate of 120 Hz given today's fast LCD technology. The scan would be timed to lag the scan of the LCD by a certain period of time, in order for the LCD pixels to complete their change to a new image before being illuminated by the new set of displayed light lines. The OLED pixel elements would be allowed to decay in brightness to zero after each scan, so that each line is off in each area by the time the next scan passes through that area.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A head-tracking autostereoscopic display, comprising:
   a) a light valve display having rows and columns and diagonal lines of pixel elements;
   b) a head sensing device mounted adjacent to the light valve display for determining a head position of at least one viewer at a viewing plane in front of the light valve display;
   c) a light panel behind the light valve display, comprising a plurality of light emitting sources, arranged in rows and columns parallel to the rows and columns of the pixel elements of the light valve display;
   d) a lens array between the light panel and the light valve display, focusing light from the light source through the light valve display toward the viewing plane;
   e) a computer having an input coupled to the head sensing device, an output coupled to the light panel and an output coupled to the light valve display;
   wherein the computer is programmed to determine the position of a viewer's head using data derived from the head sensing device, and then to sequentially flash the light emitting sources of the light panel while displaying images on the light valve display, so that right and left stereo images are directed toward the viewer's right and left eyes, respectively, so as to form an autostereoscopic image for a viewer located in or near the viewing plane.

2. The display of claim 1, in which the computer is programmed to turn on the columns of light sources in groups.

3. The display of claim 2, in which the groups are groups of four columns of light sources.

4. The display of claim 2, in which the computer is programmed to select the groups of light sources based on data returned by the head sensing device.

5. A channel plate backlight for an autostereoscopic display, comprising:
   a) a flat plate formed from a plurality of parallel channels made of a high index transparent material; and b) a plurality of controllable light sources, each of the plurality of light sources being arranged to introduce light into an end of at least one of the plurality of parallel channels, such that light is reflected through the channels by total internal reflection.

6. The backlight of claim 5, in which the channels have a width in the range of 0.25 mm to 2 mm.

7. The backlight of claim 5, in which the channels have a length of at least 100 mm.

8. The backlight of claim 5 in which the channels are made of individual lengths of plastic or glass.

9. The backlight of claim 5, in which a base of the channels is imprinted with areas of reflecting paint.

10. The backlight of claim 9, in which the areas of reflecting paint are of varying width, with the width being larger near a center of each channel than at the edges, such that an equal amount of light is reflected from each area.

11. The backlight of claim 5, further comprising a flat black opaque sheet, mounted to a rear of the channels.

12. The backlight of claim 5, further comprising a circularly polarizing sheet on a front side of the channels.

13. The backlight of claim 5, in which the plurality of light sources comprise light emitting diodes mounted adjacent at least one end of each channel.

14. The backlight of claim 13, in which there is a light-emitting diode at each end of each channel.

15. The backlight of claim 13, further comprising a reflective surface mounted adjacent to the opposite end of each channel from the end in which there is a light-emitting diode.

16. The backlight of claim 5, in which the plurality of light sources comprise a plurality of light emitting diodes, light from each of the light emitting diodes being routed to an end of at least one of the plurality of channels by fiber optics.

17. The backlight of claim 16, in which each of the plurality of light emitting diodes is coupled to a plurality of strands of fiber optic, such that light from each of the light emitting diodes is routed to a group of channels.

18. A plate backlight for an autostereoscopic display, comprising:
 a) a first planar substrate having a plurality of parallel grooves formed on a first face;
 b) a plurality of fiber optic strands modified to emit light evenly from their sides, each of the plurality of fiber optic strands having a length located in one of the plurality of grooves in the first face of the first planar substrate and a length extending from the length in the groove to an end outside the first planer substrate;
 c) a second planar substrate having a flat face attached to the first face of the first planar substrate, so that the plurality of fiber optic strands are retained in the plurality of grooves by the flat face of the second planar substrate; and
 d) a plurality of light sources, each of the light sources being coupled to the ends of a group of fiber optic strands.

19. The backlight of claim 18, in which the second planar substrate is transparent.

20. The backlight of claim 18, further comprising a reflective mirror on an edge of the backlight, opposite an edge into which the fiber optic strands enter the grooves of the first planar substrate.

\* \* \* \* \*